United States Patent
Vaid et al.

(10) Patent No.: US 7,353,433 B2
(45) Date of Patent: Apr. 1, 2008

(54) POISONED ERROR SIGNALING FOR PROACTIVE OS RECOVERY

(75) Inventors: Kushagra Vaid, San Jose, CA (US);
Suresh Marisetty, San Jose, CA (US);
Yaron Shragai, Natick, MA (US);
Koichi Yamada, Los Gatos, CA (US);
Rajendra Kuramkote, Newcastle, WA (US); Scott Brenden, Bothell, WA (US)

(73) Assignee: Intel Corporation, Santa Clara, CA (US)

( * ) Notice: Subject to any disclaimer, the term of this patent is extended or adjusted under 35 U.S.C. 154(b) by 376 days.

(21) Appl. No.: 10/728,836

(22) Filed: Dec. 8, 2003

(65) Prior Publication Data
US 2005/0138487 A1 Jun. 23, 2005

(51) Int. Cl.
*G06F 11/00* (2006.01)
(52) U.S. Cl. .................................... 714/54
(58) Field of Classification Search .............. 714/5, 714/15, 48, 49, 52, 54, 758
See application file for complete search history.

(56) References Cited

U.S. PATENT DOCUMENTS

| | | | | |
|---|---|---|---|---|
| 5,214,652 A * | 5/1993 | Sutton | ........................... | 714/10 |
| 5,249,212 A * | 9/1993 | Covey et al. | ................ | 714/765 |
| 5,528,750 A * | 6/1996 | Lubart et al. | .................. | 714/15 |
| 5,948,107 A * | 9/1999 | Ramanathan | ................... | 714/2 |
| 6,014,756 A * | 1/2000 | Dottling et al. | ................ | 714/15 |
| 6,035,436 A * | 3/2000 | Wu et al. | .................... | 714/797 |
| 6,044,479 A * | 3/2000 | Dell | .............................. | 714/48 |
| 6,052,819 A * | 4/2000 | Barker et al. | ................ | 714/776 |
| 6,151,689 A * | 11/2000 | Garcia et al. | .................. | 714/49 |
| 6,233,702 B1 * | 5/2001 | Horst et al. | .................... | 714/48 |
| 6,349,390 B1 * | 2/2002 | Dell et al. | ....................... | 714/6 |
| 6,405,322 B1 * | 6/2002 | Gaither et al. | ................. | 714/5 |
| 6,457,154 B1 * | 9/2002 | Chen et al. | ................. | 714/768 |
| 6,460,154 B1 * | 10/2002 | Duxbury | ...................... | 714/751 |
| 6,536,000 B1 * | 3/2003 | Jackson et al. | ............... | 714/57 |
| 6,560,725 B1 * | 5/2003 | Longwell et al. | ............. | 714/54 |
| 6,594,785 B1 * | 7/2003 | Gilbertson et al. | ........... | 714/48 |
| 6,647,517 B1 * | 11/2003 | Dickey et al. | ................ | 714/48 |
| 6,651,193 B1 * | 11/2003 | Dickey et al. | ................ | 714/48 |
| 6,662,319 B1 * | 12/2003 | Webb et al. | ................... | 714/52 |
| 6,751,756 B1 * | 6/2004 | Hartnett et al. | ............... | 714/54 |
| 6,757,848 B2 * | 6/2004 | Bartlett | ......................... | 714/42 |
| 6,823,476 B2 * | 11/2004 | Williams et al. | .............. | 714/25 |
| 6,948,094 B2 * | 9/2005 | Schultz et al. | ................ | 714/15 |
| 7,007,210 B2 * | 2/2006 | Fields et al. | ................. | 714/718 |
| 7,089,461 B2 * | 8/2006 | Gilbert et al. | ................ | 714/47 |
| 7,222,270 B2 * | 5/2007 | Meaney et al. | ................ | 714/48 |
| 7,308,610 B2 * | 12/2007 | Kuramkote et al. | .......... | 714/38 |
| 2002/0144193 A1 * | 10/2002 | Hicks et al. | ................... | 714/48 |
| 2003/0074601 A1 * | 4/2003 | Schultz et al. | ................ | 714/15 |

(Continued)

OTHER PUBLICATIONS

Quach, N., "High Availability and Reliability in the Itanium Processor," IEEE Micro, Sep.-Oct. 2000, pp. 61-69.

*Primary Examiner*—Michael Maskulinski
*Assistant Examiner*—Elmira Mehrmanesh
(74) *Attorney, Agent, or Firm*—Venable LLP; James R. Burdett

(57) ABSTRACT

Use of data poisoning techniques may permit proactive operating system recovery without needing to always bringing down the operating system when uncorrectable errors are encountered.

20 Claims, 2 Drawing Sheets

U.S. PATENT DOCUMENTS

| | | | |
|---|---|---|---|
| 2003/0159086 A1* | 8/2003 | Arndt | 714/25 |
| 2004/0019835 A1* | 1/2004 | Marisetty et al. | 714/48 |
| 2004/0139374 A1* | 7/2004 | Meaney et al. | 714/48 |
| 2004/0153842 A1* | 8/2004 | Dickey et al. | 714/42 |
| 2005/0015672 A1* | 1/2005 | Yamada | 714/38 |
| 2006/0107125 A1* | 5/2006 | Hsu et al. | 714/100 |
| 2006/0156153 A1* | 7/2006 | Fossum et al. | 714/746 |

* cited by examiner

POISONED ERROR SIGNALING FOR PROACTIVE OS RECOVERY

FIELD OF THE INVENTION

Embodiments of the present invention may relate to the field of fault-tolerant computing and, more specifically, to the detection and mitigation of the effects of data errors.

BACKGROUND OF THE INVENTION

Despite the presence of error-control coding (ECC) in computer systems, it is still possible for uncorrectable errors to occur. For example, in many systems a two-bit ECC (2×ecc) error may not be correctable. If data containing such errors is consumed by the processor, it may cause spurious computational results, or it may even cause the operating system (OS) to go down, e.g., by means of a machine check abort (MCA).

One way of dealing with such uncorrectable errors is, upon detection of such errors by the processor, to assert a global MCA. This has the effect of bringing down the system, however. As a result, the availability and reliability of the computer system are reduced.

One refinement of this process is to detect uncorrectable data errors and to mark the data containing such errors. This technique is known as "data poisoning." As a result, if the processor detects that the data it is about to consume has been "poisoned," it can invoke an MCA to avoid the consumption of the poisoned data. While this provides a more convenient technique by which a processor can detect the presence of such uncorrectable errors, it provides only an incremental improvement in availability and reliability, as it is still necessary to bring down the system.

DEFINITIONS

Components/terminology used herein for one or more embodiments of the invention is described below:

In some embodiments, "computer" may refer to any apparatus that is capable of accepting a structured input, processing the structured input according to prescribed rules, and producing results of the processing as output. Examples of a computer may include: a computer; a general purpose computer; a supercomputer; a mainframe; a super mini-computer; a mini-computer; a workstation; a micro-computer; a server; an interactive television; a hybrid combination of a computer and an interactive television; and application-specific hardware to emulate a computer and/or software. A computer may have a single processor or multiple processors, which may operate in parallel and/or not in parallel. A computer may also refer to two or more computers connected together via a network for transmitting or receiving information between the computers. An example of such a computer may include a distributed computer system for processing information via computers linked by a network.

In some embodiments, a "machine-accessible medium" may refer to any storage device used for storing data accessible by a computer. Examples of a machine-accessible medium may include: a magnetic hard disk; a floppy disk; an optical disk, like a CD-ROM or a DVD; a magnetic tape; a memory chip; and a carrier wave used to carry machine-accessible electronic data, such as those used in transmitting and receiving e-mail or in accessing a network.

In some embodiments, "software" may refer to prescribed rules to operate a computer. Examples of software may include: code segments; instructions; computer programs; and programmed logic.

In some embodiments, a "computer system" may refer to a system having a computer, where the computer may comprise a computer-readable medium embodying software to operate the computer.

BRIEF DESCRIPTION OF THE DRAWINGS

Preferred embodiments of the invention will now be described in connection with the associated drawings, in which.

DETAILED DESCRIPTION OF PREFERRED EMBODIMENTS

Figure 1:
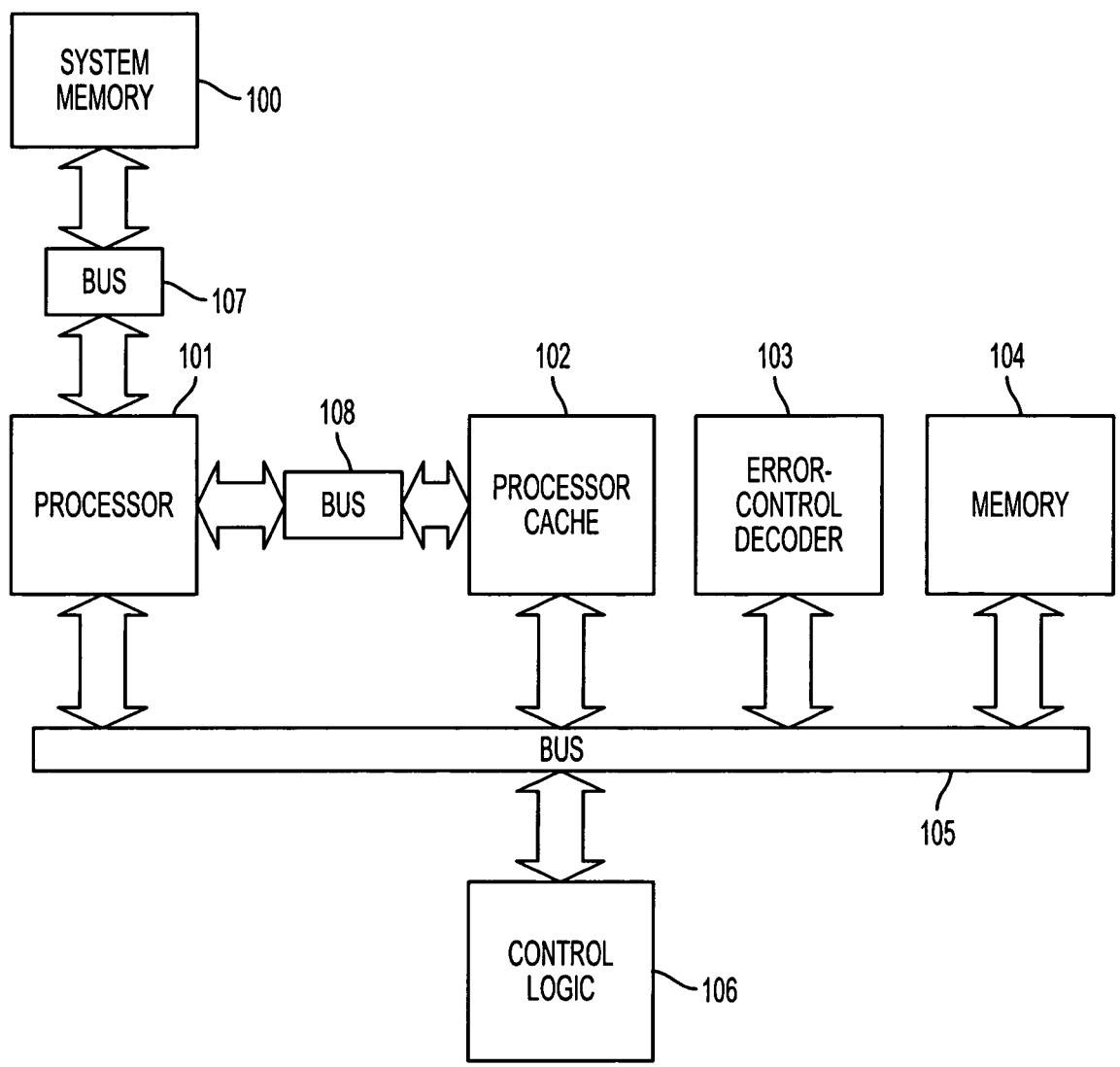
FIG. 1 depicts a conceptual block diagram of a computer system adapted to implement an embodiment of the invention.

FIG. 1 shows a conceptual block diagram of a computer system adapted to implement an embodiment of the present invention. The computer system may include at least one processor 101, accompanied by system memory 100, used to store system software for running on processor 101. Processor 101 may also have an associated processor cache 102, typically used to store data to be processed by an application being run on processor 101. Additional memory 104 may be available to store data, software, etc. In some embodiments, memory 104 and system memory 100 may comprise locations within a common physical memory device. Additionally, in some embodiments, there may be multiple memory devices comprising system memory 100, memory 104, and/or processor cache 102.

As shown, system memory 100 may be coupled to processor 101 through a bus 107, and processor 101 may also be coupled to processor cache 102 through a bus 108. While shown directly coupled in FIG. 1, it would be understood by one skilled in the art that the processor and all of its memories may be inter-linked by one or more buses.

FIG. 1 shows a bus 105 that links various components of the computer system. For example, data from one component (e.g., memory 104) may be sent to processor 101 for processing or for storing in system cache 102 through bus 105. Furthermore, bus 105 may include multiple buses.

Also shown in FIG. 1 is an error-control decoder 103. Data in the computer system may be protected using error-control coding. Error-control decoder 103 may contain logic for checking data to ensure that it is error-free and for correcting any errors that may be correctable using the error-control coding. Error-control decoder 103 may be implemented in hardware or as software/firmware, run in conjunction with processor 101 (i.e., implemented on or as part of processor 101), or as a combination of both. Error-control decoder 103 may further be implemented as part of one or more of the memory blocks (100, 102, 104).

Furthermore, the system may include multiple error-control decoders 103, implemented in any of the ways previously described, and this may enable the system to check for errors in multiple locations. For example, one error-control decoder 103 may be adapted to check for outbound data errors from processor 101 to a memory unit (e.g., memory 104), while a second error-control decoder 103 may be adapted to check for inbound errors. In the case in which an error-control decoder 103 checks for outbound errors, there may be further capability, e.g., within the memory unit, to inform an operating system of the computer system of the presence of corrupted data, in a similar fashion to the process described below.

Error-control decoder 103 may be further adapted to mark data as being "bad," i.e., poisoning the data, if it determines that the data contains one or more uncorrectable errors. Typically, error-control decoder 103 may poison a larger unit of data, for example, a cache line, that contains the erroneous data; however, the invention is not limited to this case. Error-control decoder 103 may, for example, operate on data in a memory unit, typically, processor cache 102, or data being transmitted over a bus 105, 107, or 108.

The computer system of FIG. 1 may further include control logic 106. Control logic 106 may be used when data is poisoned by error-control decoder 103 to interact with processor 101 and to control the transmission of notification of data poisoning to processor 101 (i.e., to an operating system running on the processor). Control logic 106 may be implemented as part of processor 101, in addition to the implementation shown in FIG. 1. Such data poisoning notification may include information that may enable recovery of the poisoned data. For example, such information may include a target address corresponding to data in which the errors occurred.

In a particular embodiment of the invention, a handshaking process may occur between the control logic 106 and an operating system running on processor 101, in which recovery-related information is passed to the operating system.

Figure 2:
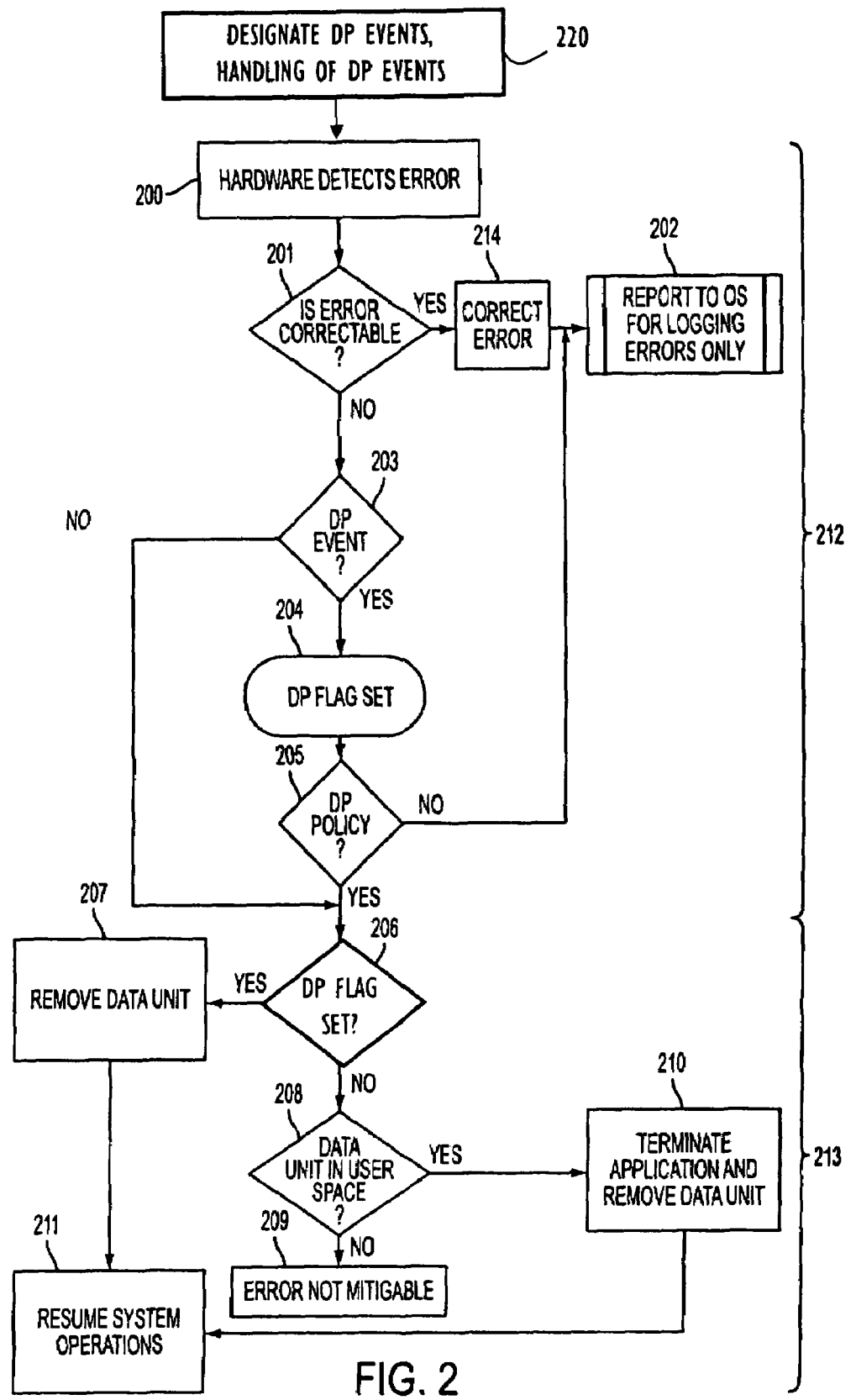
FIG. 2 depicts a flowchart of a method implementing an embodiment of the invention.

FIG. 2 is a flowchart depicting an embodiment of the inventive method. Overall, there may be operations that are executed in hardware and/or firmware and/or non-OS software 212 and those that may be executed by an operating system (OS) 213 running on processor 101. In particular, the components included in 213 may be included in an OS MCA routine.

First, data units may be checked for errors 200; this may involve error-control decoder 103. It may then be determined if errors that are detected are correctable or uncorrectable 201. If they are correctable, they may be corrected 214 and may then be reported to the OS for logging 202 (as being correctable). In this case, no further action may be necessary with respect to that data unit.

On the other hand, if the error-control decoder 103 determines that there are uncorrectable errors 201, then the system may determine if the resulting uncorrectable errors are data poisoning (DP) events 203. In particular, a system may be designed so that DP events correspond to resident data units found in certain storage locations (e.g., cache 102, or memory 100 or 104) or during its transmission to or from these storage locations over a bus (e.g., bus 105, 107, or 108). Alternatively, the system may be designed to check for errors in data units in other portions of the system. In summary, the system designer may decide what uncorrectable errors are designated as being DP events and which, if any, are not (block 220).

If an uncorrectable error situation arises that is not a DP event, the corresponding data unit, including the erroneous data, may be consumed (i.e., by an application running on the computer system or by the operating system); the process may skip to block 206.

If an uncorrectable error situation corresponds to a DP event, then a DP flag associated with the corresponding data unit may be set 204. If the system has a policy for addressing DP events or errors 205, in which immediate notification (action) occurs, the process may continue to block 206. Otherwise, the error may only be reported for logging 202. Note that whether the system provides immediate notification is an option that may be determined by a system designer or by a system operator, for example, in block 220, depending upon the particular system.

In the case where the process has progressed to block 206, the process has entered the portion that may be performed by the OS. When reading in a data unit, the OS may determine if the DP flag has been set 206. If yes, then the data unit was poisoned and may be removed 207. System operation may then resume 211 without experiencing the results of consuming the erroneous data.

If the DP flag has not been set, however, whether or not the data errors can be mitigated may depend on where the erroneous data lies 208. If the data unit containing the erroneous data is in user space, the OS may still detect the presence of the error, terminate the application, and remove the data unit 210. In this case, system operation may resume 211, as above.

On the other hand, if the erroneous data is in OS space, the erroneous data may be consumed by the OS 209. As a result, whether or not the OS is able to recover may depend on in what location the error(s) occurred. If the OS can not recover, it may initiate a graceful shutdown, which may still provide some degree of error mitigation, as long as the effects of the error(s) are not permanent (e.g., where permanently-stored data has not been corrupted as a result of the error(s)).

In a further variation on the above method and computer system, it may be possible for either the operating system or the system designer to select whether or not to invoke a data poisoning method as described above. Implementing such a feature, for example, in block 220, may permit the system designer or operator to select an error-handling technique in accordance with system requirements. For example, there may be a software-visible control bit that permits the selection of either immediate notification of an uncorrectable error situation (i.e., invoking a policy of addressing data poisoning events; see FIG. 2, reference numeral 205) or to defer notification (i.e., to let the OS detect if data contains uncorrected errors). If so, the detection of whether this control bit has been set may occur in block 206 of FIG. 2.

The invention has been described in detail with respect to preferred embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

What is claimed is:

1. A method of addressing data errors in a computer system, comprising:
   pre-determining a software-programmable data poisoning policy to control actions to be taken based on different classes of data poisoning events by a user;
   error-checking a unit of data by an error-control decoder;
   detecting an uncorrectable error in the unit of data by the error-control decoder;
   if the uncorrectable error is detected in the unit of data, based on the pre-determined data poisoning policy, determining if the detected uncorrectable error is a data poisoning event;
   marking the unit of data containing a data poisoning event with a software-visible bit by the error-control decoder which software-visible bit is a status bit to indicate to an operating system that the data unit contains the data poisoning event;

determining, based on the pre-determined data poisoning policy, if the unit of data containing the poisoning event is to be acted upon;

handing over the data units including the detected uncorrectable errors including data poisoning events from the error-control decoder to the operating system;

detecting by the operating system whether the software-visible bit is present in the data unit; and based on the detected software-visible bit and the pre-determined data poisoning policy, acting, by the operating system of the computer system, to address the presence of the uncorrectable error in the unit of data, including:

if the software-visible bit is detected, one of removing the marked data unit from a use by the operating system and recovering the data unit or determining if the unit of data is in user space and one of terminating an application running on the computer system and removing the unit of data from use by the operating system or shutting down the operating system, and if the software-visible bit is not detected, determining whether the data unit is in the user space and one of terminating the application running on the computer system and removing data unit from use by the operating system or shutting down the operating system.

2. The method of claim 1, wherein error-checking comprises:

applying error-control decoding to the unit of data.

3. The method of claim 2, wherein error-checking further comprises:

correcting correctable errors in the unit of data.

4. The method of claim 1, further comprising:

upon detection of an uncorrectable error in said unit of data, providing information to said operating system to enable recovery of said unit of data.

5. The method of claim 4, wherein the information includes a target address corresponding to said unit of data.

6. The method of claim 1, wherein detecting is performed by at least one of a processor or a memory.

7. A computer system comprising:

a software-programmable data poisoning policy to control actions to be taken based on different classes of data poisoning events;

a processor;

at least one error control decoding implementation including an error-control decoder to implement error-control decoding in conjunction with the processor, adapted to process units of data and to detect if a unit of data contains at least one uncorrectable error; and a module to run on said processor to determine, based on the pre-determined data poisoning policy, if said uncorrectable error is a data poisoning event, and, if so, to mark unit of data containing said uncorrectable error and hand over the data units including the detected uncorrectable errors including data poisoning events from the error-control decoder to an operating system which runs on said processor, the operating system to determine, based on the pre-determined data poisoning policy, if a particular data poisoning event is to be acted upon or not, the operating system adapted to detect the marked unit of data and to act to mitigate the detected uncorrectable error without always bringing down the operating system upon detection of the marked unit of data.

8. The computer system of claim 7, further comprising:

a memory coupled to said error control decoding implementation, wherein the error-control decoding implementation is adapted to process units of data stored in the memory.

9. The computer system of claim 8, wherein said memory comprises:

a processor cache.

10. The computer system of claim 7, further comprising:

at least one bus coupled to said error-control decoding implementation, wherein the error-control decoding implementation is adapted to process units of data passing through the bus.

11. The computer system of claim 7, further comprising:

logic adapted to control signaling of information relating to one or more uncorrectable data errors.

12. The computer system of claim 11, wherein the logic comprises:

programmable logic.

13. The computer system of claim 11, wherein the information includes a target address corresponding to a unit of data containing the detected uncorrectable error.

14. A machine-accessible storage medium containing software code that, when read by a computer, causes the computer to perform a method comprising:

by a user, pre-determining a software-programmable data poisoning policy to control actions to be taken based on different classes of data poisoning events;

error-checking a unit of data by an error-control decoder;

if an uncorrectable error is detected in the unit of data, based on the pre-determined data poisoning policy, determining if the detected uncorrectable error is a data poisoning event, and if so, marking the unit of data containing a data poisoning event with a software-visible bit by the error-control decoder;

determining, based on the pre-determined data poisoning policy, if the unit of data containing poisoning event is to be acted upon, and if so, handing over the data units including the detected uncorrectable errors including data poisoning events from the error-control decoder to an operating system;

detecting, by the operating system of the computer, the software-visible bit in the unit of data; and in accordance with the detected software-visible control bit and the pre-determined data poisoning policy, acting, by the operating system of the computer to address the presence of the uncorrectable error in the unit of data, wherein the operating system is not always brought down.

15. The machine-accessible storage medium of claim 14, further comprising software code that, when read by a computer, causes the computer to also perform the following:

if the operating system detects the software-visible bit, determining if the unit of data is in user space; and if the unit of data is in user space, terminating an application running on the computer and removing the unit of data from use by the operating system.

16. The machine-accessible storage medium of claim 14, wherein said acting upon the presence of the uncorrectable error comprises:

removing the unit of data from use by the operating system.

17. A computer system comprising:

a processor; and machine-accessible storage medium to be coupled to the processor, the processor to access the machine-accessible storage medium and to execute software code stored on the machine-accessible storage medium, to cause the computer system to perform a method comprising:

by a user, pre-determining a software-programmable data poisoning policy to control actions to be taken based on different classes of data poisoning events;

error-checking a unit of data by an error-control decoder;

if an uncorrectable error is detected in the unit of data, based on the pre-determined data poisoning policy, determining if the detected uncorrectable error is a data poisoning event, and if so, marking the unit of data containing a data poisoning event with a software-visible bit by the error-control decoder;

determining, based on the pre-determined data poisoning policy, if the unit of data containing poisoning event is to be acted upon, and if so, handing over the data units including the detected uncorrectable errors including data poisoning events from the error-control decoder to an operating system and detecting, by the operating system of the computer system, the software-visible bit in the unit of data; and in accordance with the detected software-visible control bit and the pre-determined data poisoning policy, acting, by the operating system to address the presence of the uncorrectable error in the unit of data, wherein the operating system is not always brought down.

18. The computer system of claim 17, wherein the machine-accessible storage medium further comprises software code that, when executed by the processor, causes the computer system to further perform:

if the operating system detects the software-visible bit, determining if the unit of data is in user space; and if the unit of data is in user space, terminating an application running on the computer system and removing the unit of data from use by the operating system.

19. The computer system of claim 17, wherein the machine-accessible storage medium further comprises software code that, when executed by the processor, causes the computer system to further perform:

removing the unit of data from use by the operating system.

20. The computer system of claim 17, further comprising:

at least one bus to couple the processor with the machine-accessible storage medium.

* * * * *